Figure 1:
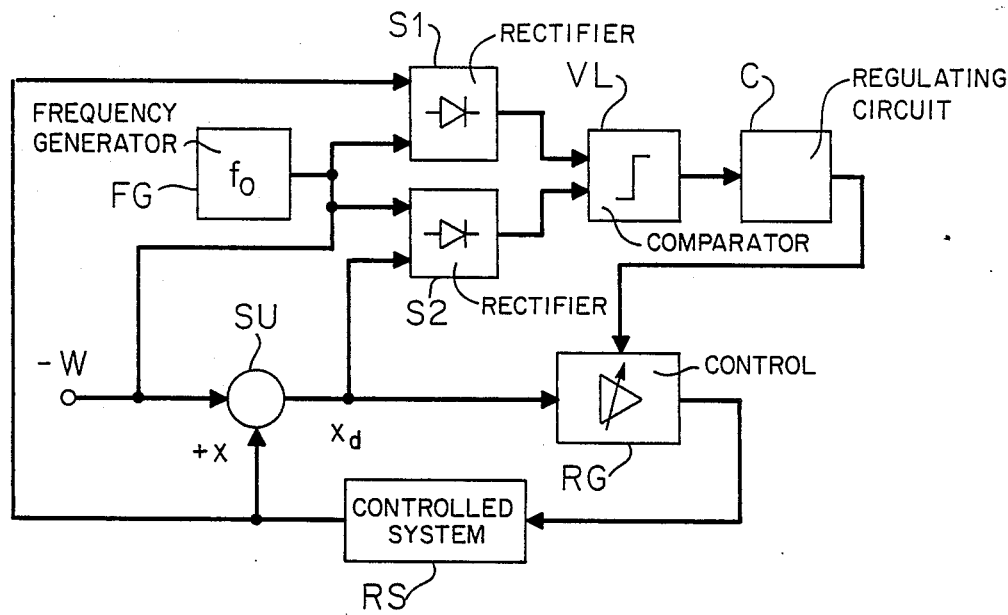

United States Patent [19]

Kurz et al.

[11] Patent Number: 4,827,202

[45] Date of Patent: May 2, 1989

[54] METHOD OF AND CIRCUITRY FOR AUTOMATICALLY ADJUSTING THE VARIABLE-GAIN AMPLIFICATION IN A CONTROL LOOP

[75] Inventors: Arthur Kurz, Karlsbad-Langensteinbach; Engelbert Läufer, St. Georgen; Wilfried Rohde, Unterkirnach, all of Fed. Rep. of Germany

[73] Assignee: Deutsche Thomson-Brandt GmbH, Villingen, Fed. Rep. of Germany

[21] Appl. No.: 111,039

[22] Filed: Oct. 21, 1987

[30] Foreign Application Priority Data

Oct. 22, 1986 [DE] Fed. Rep. of Germany ....... 3635859

[51] Int. Cl.[4] .............................................. G05B 1/02
[52] U.S. Cl. .................................... 318/608; 388/910; 388/933; 388/917; 388/902; 388/934
[58] Field of Search .................. 73/900; 318/798–800, 318/803, 807–811, 329, 306–314, 606–610, 628; 364/167, 172–176

[56] References Cited

U.S. PATENT DOCUMENTS

| | | | |
|---|---|---|---|
| 3,395,322 | 12/1968 | Peterssen et al. ................... | 318/608 |
| 3,548,282 | 1/1969 | Schiller ............................... | 318/608 |
| 4,158,163 | 6/1979 | Eriksen et al. ...................... | 318/798 |
| 4,302,666 | 11/1981 | Hawkins .............................. | 318/592 |
| 4,310,791 | 1/1982 | Akamatsu ............................ | 318/808 |
| 4,331,263 | 5/1982 | Brown ................................. | 318/132 |
| 4,475,631 | 10/1984 | Nomura .............................. | 318/759 |

*Primary Examiner*—William M. Shoop, Jr.
*Assistant Examiner*—David Martin
*Attorney, Agent, or Firm*—Max Fogiel

[57] ABSTRACT

In a control loop for automatically adjusting variable-gain amplification, a sinusoidal signal with a frequency $f_o$ that is critical for the control loop is superimposed over a positioning parameter W. Two synchronous rectifiers S1 and S2 filter out the oscillation components of a control parameter x and of a control difference $x_d$ that contain frequency $f_o$, and the components are compared in a comparator VL. A control and regulating circuit C continues to vary the variable-gain amplification at controls RG until the amplitudes of the oscillation components being compared in the comparator are equal. The variable-gain amplification is correct at that point. The variable-gain amplification can even be adjusted in a compact-disk player while the player is in operation.

9 Claims, 2 Drawing Sheets

METHOD OF AND CIRCUITRY FOR AUTOMATICALLY ADJUSTING THE VARIABLE-GAIN AMPLIFICATION IN A CONTROL LOOP

The invention concerns a method of and circuitry for automatically adjusting the variable-gain amplification in a control loop.

Control loops are employed in copmact-disk players for example to position the optical scanner on the disk's data track and to focus the beam of scanning light on the surface of the disk. These servo circuits—the tracking circuit and the focusing circuit—must operate precisely and be precisely adjusted to allow unobjectionable audio playback. Amplification is usually controlled by hand in this type of controls by adjusting a potentiometer. Adjustments of this type are relatively troublesome and time-consuming. Furthermore, since the electric components of the control loops and optical scanner age over time, the controls' amplification must be readjusted by hand, and manual readjustment during both manufacture and maintenance is of course a drawback because it costs both time and money.

The object of the invention is accordingly to eliminate the time-consuming adjustments that must be carried out during manufacturing and the later readjustments of variable-gain amplification that occur during maintenance.

The invention, a method of automatically adjusting the variable-gain amplification of a control loop, attains this object in that a sinusoidal signal with a frequency f is superimposed over a positioning parameter W, in that the amplitudes of a control parameter x and of a control difference $x_d$ are compared, and in that a criterion for adjusting the variable-gain amplification is derived from the comparison.

IN THE DRAWING

Figure 3:
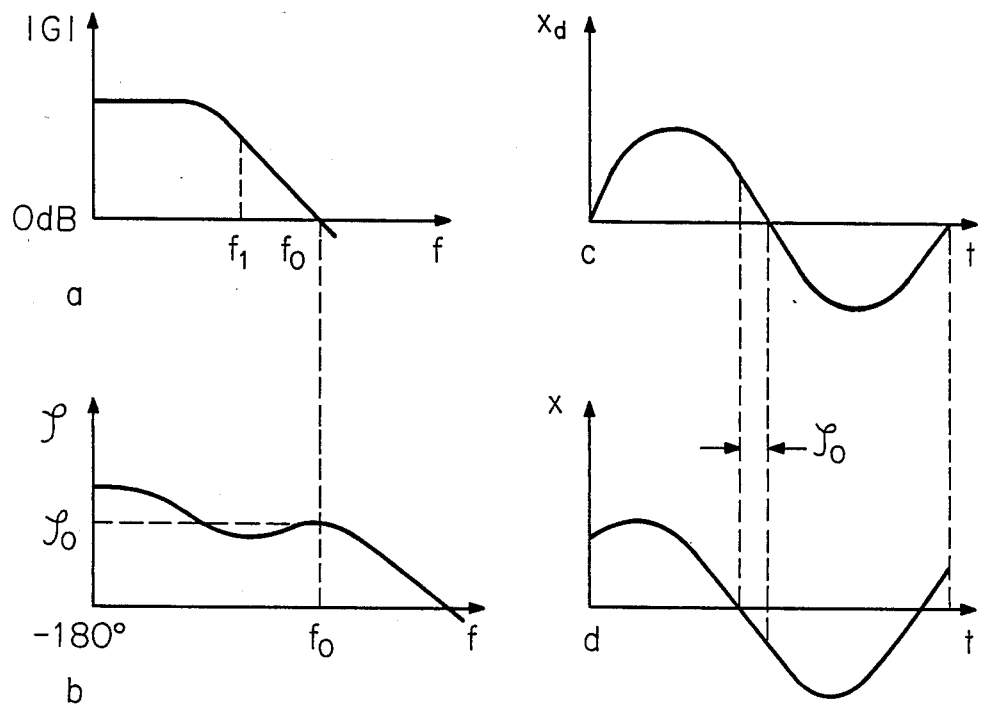
Figure 2:
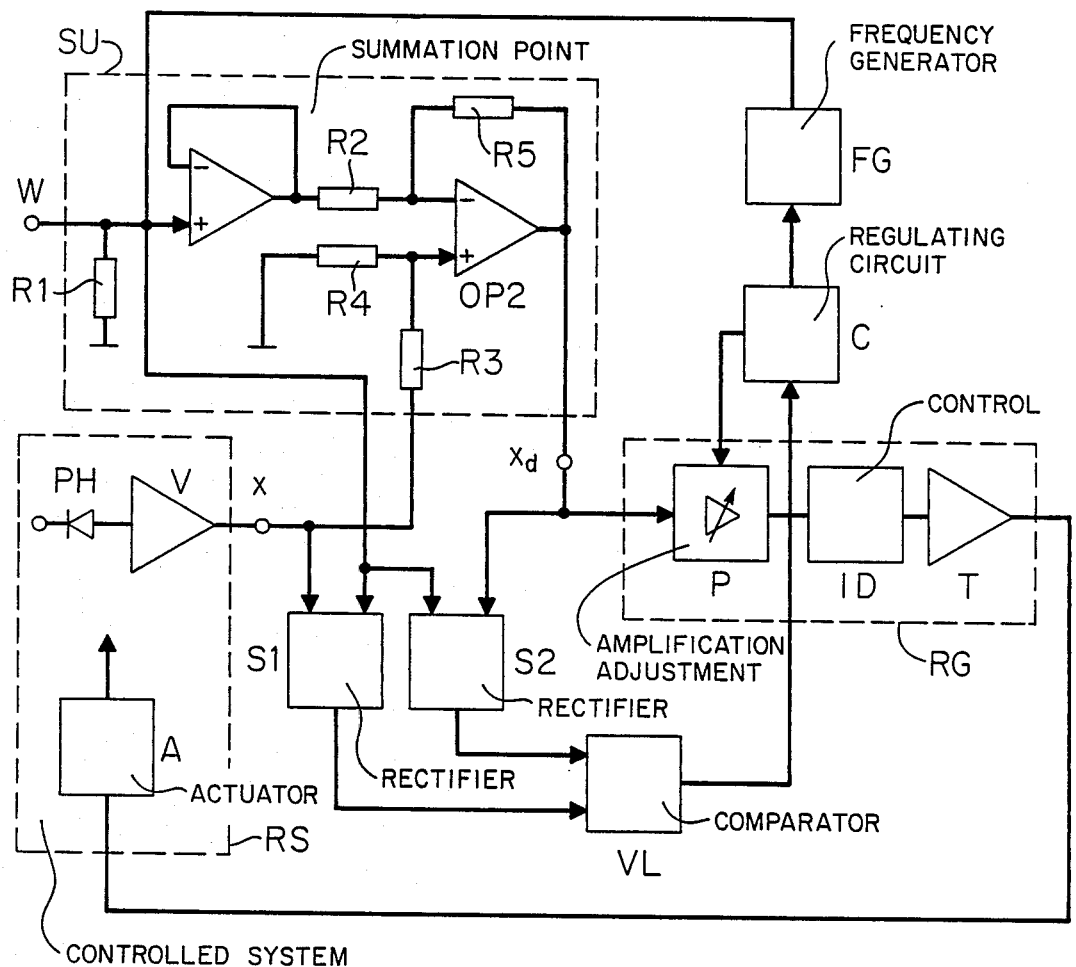

FIG. 1 is a block diagram illustrating how the method in accordance with the invention is carried out, FIG. 2 is a block diagram illustrating how the embodiment illustrated in FIG. 1 can be employed in a compact-disk player, and FIG. 3 is a Bode graph illustrating the invention.

The output terminal of the controls RG illustrated in FIG. 1 are connected as in a conventional control loop to the input terminal of a controlled system RS, the output terminal of which is connected to the second input terminal of a summation point SU. Positioning parameter W is supplied to the first input terminal of summation point SU, the output terminal of which is connected to the input terminal of controls RG. The output terminal of a frequency generator FG is connected to the first input terminal of summation point SU, to the first input terminal of a synchronous rectifier S1, and to the first input terminal of a second synchronous rectifier S2. The output terminal of first synchronous rectifier S1 is connected to the first input terminal of a comparator VL, and the second input terminal of rectifier S1 is connected to output terminal of controlled system RS. The output terminal of second synchronous rectifier S2 is connected to the second input terminal of comparator VL. The second input terminal of rectifier S2 is connected to the output terminal of summation point SU. The output terminal of comparator VL is connected to to the input terminal of a control and regulating circuit C, the output terminal of which is connected to the input terminal for adjusting the amplification of controls RG.

The circuitry in FIG. 2 will now be described with reference to FIG. 3.

FIG. 3a shows the level of variable-gain amplification G, also called loop amplification, and FIG. 3b shows phase $\rho$, both as a function of frequency f. At frequency $f_o$, which is called the critical frequency, the level characteristic intersects the O-dB line. At frequency $f_o$, the loop amplification is precisely 1, and the phase reserve yields $\rho_o$.

To adjust the variable-gain amplification, frequency generator FG generates a sinusoidal signal with a frequency $f_o$ and supplies it to the first input terminal of synchronous rectifiers S1 and S2. The same signal is superimposed over positioning parameter W. Since control parameter x is supplied to the input terminal of first synchronous rectifier S1, the oscillation component with the same frequency as frequency $f_o$ is filtered out of the parameter at the rectifier's output terminal. The oscillation component with the same frequency as frequency $f_o$ is also filtered out of control difference $x_d$ at the output terminal of second synchronous rectifier S2 because the difference is supplied to the second input terminal of that rectifier. The instantaneous amplitudes of the oscillation components of control parameter x and of control difference $x_d$ are compared in comparator VL. Control and regulating circuit C now continues to vary the amplification of controls RG until comparator VL provides a signal at its output terminal that indicates that the filtered-out oscillation components equal the frequency $f_o$ of control parameter x and of control difference $x_d$. When these two parameters are equal, the variable-gain amplification will be approximately 1. Since, however, this adjustment is carried out at the critical frequency $f_o$, the variable-gain amplification will also be approximately adjusted to the correct value. The variable-gain amplification, however, is still not precisely adjusted because the frequency $f_o$ of control parameter x and of control difference $x_d$ are not in phase but are mutually displaced to the extent of phase reserve $\rho_o$ as illustrated in FIGS. 3c and 3d.

To precisely adjust the variable-gain amplification to 1 at frequency $f_o$, the maximum amplitudes of the oscillation components with the frequency $f_o$ of control parameter x and of control difference $x_d$ must be compared. This can be done because the synchronous rectifiers are not phase-dependent but phase-independent. Since the maximum amplitudes of the oscillation components with the frequency $f_o$ of control parameter x and control difference $x_d$ can be obtained from the output terminals of the phase-independent synchronous rectifiers, these amplitudes can be compared in comparator VL. The variable-gain amplification is accordingly precisely adjusted to 1 at frequency $f_o$.

There is, however, an advantage to using phase-dependent synchronous rectifiers in that phase reserve $\rho_o$ can be constantly monitored. If it becomes too low, if, that is, it drops below a prescribed threshold, the variable-gain amplification is decreased. This measure ensures that the stability of the control loop is maintained.

Instead of the critical frequency $f_o$, it is also possible to employ another frequency $f_1$, assuming that the loop amplification for this frequency is known. In comparing the amplitudes of control parameter x and control difference $x_d$, however, it must then be kept in mind that these amplitudes will, due to the loop amplification being different from 1, differ only to a certain extent. For the particular frequency $f_1$ for example, the loop amplification might be 2. Control and regulating circuit C will in this case continue to vary the amplification of controls RG until comparator VL indicates by means of a signal at its output terminal that the filtered-out oscillation components with frequency $f_1$ are twice as large in relation to control parameter x as in relation to control difference $x_d$. If on the other hand comparator VL tests as before for equivalence, either an amplifier with an amplification of ½ will have to be positioned upstream of the second input terminal of first synchronous rectifier S1 or one with an amplification of 2 will have to be positioned upstream of the second input terminal of second synchronous rectifier S2.

Since synchronous rectifiers and phase-independent synchronous rectifiers are described on pages 797–802 of U. Tietze and Ch. Schenk, Halbleiter-Schaltungstechnik ["Semiconductor Circuitry"], 7th rev. ed., Springer, 1985, their design and function will not be specified herein.

It is adequate for many purposes to employ simple synchronous rectifiers, in which case the amplitude of the sinusoidal signal for the frequency $f_o$ generated by frequency generator FG must be greater than when phase-independent synchronous rectifiers are employed. It will always be possible to adjust the variable-gain amplification even when the controls are in operation, and the burdensome manual readjustment can be completely done within. If the parameter drifts due to aging and variations in temperature of the electronic components in the control loop, it will be automatically compensated.

The amplification of controls RG can also be adjusted by making positioning parameter W zero and using only the sinusoidal signal generated by frequency generator FG as the single "positioning parameter" at the first input terminal of summation point SU.

FIG. 2 is a circuit diagram illustrating how the invention can be employed in a compact-disk player for the focus-and-tracking control loop. This diagram illustrates the structure of summation point SU, controls RG, and controlled system RS.

The output terminal of frequency generator FG is connected to the non-inverting input terminal of an operational amplifier OP1, which is connected to reference potential through a resistor R1, and to the first input terminal of first and second synchronous rectifiers S1 and S2. The output terminal of operational amplifier OP1 is feedbacked to its inverting input terminal and connected to the inverting input terminal of another operational amplifier OP2 through another resistor R2. The non-inverting input terminal of second operational amplifier OP2 is connected through a third resistor R3 to the output terminal of controlled system RS and to the second input terminal of first synchronous rectifier S1. It is also connected to reference potential through a fourth resistor R4. The output terminal of second operational amplifier OP2, which is feedbacked to its inverting input terminal through a fifth resistor R5, is connected to the input terminal of controls RG, which are in the form of PID controls with an adjacent driver circuit T, and to the second input terminal of second synchronous rectifier S2. As in FIG. 1, the output terminal of controls RG is connected to the input terminal of controlled system RS, which is constructed of a regulating stage, of what is called an actuator A, of an actual-value sensor in the form of a photodetector PH, and of an adjacent amplifier V. The output terminal of first synchronous rectifier S1 is connected to the first input terminal of comparator VL and the output terminal of second synchronous rectifier S2 to the second input terminal of copmarator VL. The output terminal of comparator VL is connected to the input terminal of control and regulating circuit C, the output terminal of which is connected to the input terminal for adjusting the amplification at the P section of controls RG. Another output terminal of control and regulating circuit C is connected to the control input terminal of frequency generator FG. Summation point SU is constructed out of operational amplifiers OP1 and OP2, which have an amplification of 1, and of resistors R1 through R5. Since synchronous rectifiers S1 and S2 filter out the oscillation components of frequency $f_o$ from control parameter x and control difference $x_d$, the amplitudes of both components are compared in comparator VL. Control and regulating circuit C continues to vary the amplification at the P section of controls RG until comparator VL emits a signal indicating that the amplitudes of the oscillation components equal to frequency $f_o$ of control parameter x and control difference $x_d$. If the amplitudes are equal, the variable-gain amplification will be 1 because an apmlification of 1 has been selected for second operational amplifier OP2.

Since the amplitude and frequency of the sinusoidal signal generated by frequency generator FG can be controlled, the critical frequency $f_o$ for the focusing and tracking control loop can always be established by control and regulating circuit C. The amplitude of the sinusoidal signal can also be adjusted for phase-dependent and phase-independent synchronous rectifiers. For compact-disk players the amplitude of the signal generated by frequency generator FG can be essentially greater, 10 times as high for instance, if the oscillation components of frequency $f_o$ are filtered out with low-pass or band-pass filters followed by peak rectifiers instead of synchronous rectifiers, without detriment to playback quality. It is even possible to establish the variable-gain amplification while the device is playing. In one embodiment of the invention employed in compact-disk players the control and regulating circuit C always adjusts the variable-gain amplification during the pauses between two pieces of music recorded on the disk, and the amplification is also readjusted every time the player is turned on.

This only only eliminates the necessity of adjusting the variable-gain amplification by hand during manufacture, but later manual corrections of the variable-gain amplification are also superfluous because aging of the components of the control loop and drifts in their parameters due to temperature changes are no longer significant.

Operational amplifiers OP1 and OP2, frequency generator FG, synchronous rectifiers S1 and S2, comparator VL, and control and regulating circuit C can easily be integrated. The Siemens TDA 4940 module for instance can be equipped with a phase-independent synchronous rectifier and a downstream comparator. Control parameter x or control difference $x_d$ can be applied to connection 11 and the sinusoidal oscillation in frequency $f_o$ generated internally with a voltage-controlled oscillator. Frequency $f_o$ can be established externally by providing the TDA 4940 with an RC stage. The TDA 4940 is described on pages 577 to 581 of the Siemens Data Book.

We claim:

1. An arrangement for automatically adjustable variable-gain amplification in a control loop, comprising: a controlled system; a source for supplying a positioning parameter to be followed by said controlled system; a function generator for producing a sinusoidal signal of predetermined frequency and superimposing said sinusoidal signal over said positioning parameter; means for summing said superimposed positioning parameter with a control parameter from an output of said controlled system; said summing means producing a control difference; means for comparing amplitudes of said control difference and said control parameter; means for deriving a criterian for adjusting the variable-gain ampification from an output of said comparing means; a first synchronous rectifier having a first input connected to said function generator; a second synchronous rectifier having a first input connected to said function generator; said control parameter from an output of said controlled system being connected to a second input of said first synchronous rectifier and to said summing means; said summing means having an output connected to an input of control means, said control means having an output connected to an input of said controlled system; said output of said summing means being connected to a second input of said second synchronous rectifier; said first synchronous rectifier having an output connected to a first input of said comparing means; said second synchronous rectifier having an output connected to a second input of said comparing means; regulating means having an input connected to the output of said comparing means; said regulating means having an output connected to an input of said control means for adjusting the amplification at said control means.

2. An arrangement as defined in claim 1, including a first operational amplifier having a non-inverting input connected to said function generator; a source of reference potential connected to said first operational amplifier through a resistor; said first operational amplifier having an inverting input and an output connected to said inverting input for feedback; a second operational amplifier having an inverting input connected to the output of said first operational amplifier through a second resistor; said control system having its output connected to the non-inverting input of said second operational amplifier through a third resistor; a source of reference potential connected to said non-inverting input of said second operational amplifier through a fourth resistor; said second operational amplifier having an inverting input and an output fed back to its inverting input through a fifth resistor; said second operational amplifier having its output connected also to the input of said control means and to the second input of said second synchronous rectifier.

3. An arrangement as defined in claim 1, wherein said synchronous rectifiers are phase-independent.

4. An arrangement as defined in claim 1, wherein said synchronous rectifiers are phase-dependent for measuring a phase-parameter to derive another criterion from said phase parameter for adjusting the variable-gain amplification.

5. An arrangement as defined in claim 4, wherein said variable-gain amplification is decreased when said measured phase parameter drops below a predetermined threshold.

6. A method for automatically adjusting variable-gain amplification in a control loop, comprising the steps: supplying a positioning parameter to be followed by a controlled system; superimposing a sinusoidal signal of predetermined frequency over said positioning parameter; summing said superimposed positioning parameter with a control parameter from an output of said controlled system; obtaining a control difference from said summing step; comparing amplitudes of said control difference and said control parameter; and deriving a criterion for adjusting the variable-gain amplification from said comparing step.

7. A method as defined in claim 6, wherein said sinusoidal signal of predetermined frequency only is summed with said control parameter when said positioning parameter is zero.

8. A method as defined in claim 6, wherein said predetermined frequency corresponds to the critical frequency of said control loop, the loop amplification being 1 when said predetermined frequency corresponds to said critical frequency.

9. A method as defined in claim 8, including the step of continuing variation in the variable-gain amplification until the amplitudes of said control parameter and said control difference are substantially equal.

* * * * *